United States Patent
Bhatt et al.

(10) Patent No.: US 11,044,282 B1
(45) Date of Patent: Jun. 22, 2021

(54) SYSTEM AND METHOD FOR AUGMENTED REALITY VIDEO CONFERENCING

(71) Applicant: Capital One Services, LLC, McLean, VA (US)

(72) Inventors: Gaurang Bhatt, Herndon, VA (US); Negar Kalbasi, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/991,286

(22) Filed: Aug. 12, 2020

(51) Int. Cl.
| H04L 29/06 | (2006.01) |
| G06K 9/00 | (2006.01) |
| H04N 7/15 | (2006.01) |
| G10L 17/06 | (2013.01) |
| G06T 11/00 | (2006.01) |

(52) U.S. Cl.
CPC ...... *H04L 65/4015* (2013.01); *G06K 9/00288* (2013.01); *G06K 9/00711* (2013.01); *G06T 11/00* (2013.01); *G10L 17/06* (2013.01); *H04L 67/38* (2013.01); *H04N 7/155* (2013.01)

(58) Field of Classification Search
CPC . H04L 29/06; G10L 9/00; G10L 17/06; G06T 11/00; H04N 7/15
USPC .......................................... 348/14.01–14.16
See application file for complete search history.

(56) References Cited

U.S. PATENT DOCUMENTS

| 8,194,081 | B2 | 7/2012 | Marggraff et al. |
| 8,484,027 | B1 | 7/2013 | Murphy |
| 8,868,426 | B2 | 10/2014 | Voorhees et al. |
| 9,304,601 | B2 | 4/2016 | Usey |
| 9,323,756 | B2 | 4/2016 | Locker et al. |
| 2003/0209369 | A1* | 11/2003 | Holtzman ............... G06F 3/041 178/18.01 |
| 2005/0282561 | A1 | 12/2005 | Chen |
| 2007/0177340 | A1 | 8/2007 | Miyata |
| 2008/0019592 | A1 | 1/2008 | Silverbrook et al. |
| 2008/0203175 | A1 | 8/2008 | Hu et al. |
| 2009/0013254 | A1 | 1/2009 | Walker et al. |
| 2009/0021495 | A1 | 1/2009 | Edgecomb et al. |
| 2009/0034803 | A1* | 2/2009 | Matos ...................... G06K 9/00 382/116 |
| 2009/0300503 | A1 | 12/2009 | Suhm et al. |
| 2011/0153331 | A1 | 6/2011 | Dong et al. |
| 2011/0157472 | A1 | 6/2011 | Keskinen |
| 2011/0177481 | A1 | 7/2011 | Haff et al. |
| 2011/0313771 | A1 | 12/2011 | Marggraff |
| 2011/0320206 | A1 | 12/2011 | Chen et al. |

(Continued)

*Primary Examiner* — Melur Ramakrishnaiah
(74) *Attorney, Agent, or Firm* — Hunton Andrews Kurth LLP (57) ABSTRACT

A system includes a plurality of capturing devices and a plurality of displaying devices. The capturing devices and the displaying devices can be communicatively connected to a server. The server can receive captured data from the capturing devices and transform the data into a digitized format. At least one of the capturing devices can record a video during a meeting and the capturing device can transmit the captured video to the server as a video feed. The video feed can show an area that includes handwritten text, e.g., a whiteboard. The server can receive the video feed from the capturing device and perform various processes on the video. For example, the server can perform a voice recognition, text recognition, handwriting recognition, face recognition and/or object recognition technique on the captured video.

16 Claims, 7 Drawing Sheets

(56) References Cited

U.S. PATENT DOCUMENTS

| | | | |
|---|---|---|---|
| 2012/0001923 A1 | 1/2012 | Weinzimmer et al. | |
| 2012/0041765 A1 | 2/2012 | Chien et al. | |
| 2012/0106796 A1* | 5/2012 | Jones | G06T 13/40 |
| | | | 382/103 |
| 2013/0010052 A1* | 1/2013 | Ihara | H04N 7/15 |
| | | | 348/14.07 |
| 2013/0209981 A1 | 8/2013 | Newell | |
| 2013/0321356 A1* | 12/2013 | Al-Sharif | G06F 3/0317 |
| | | | 345/179 |
| 2014/0160009 A1 | 6/2014 | Hendrickson et al. | |
| 2016/0045051 A1 | 2/2016 | Aven | |
| 2016/0063875 A1 | 3/2016 | Javidan et al. | |
| 2016/0063876 A1 | 3/2016 | Javidan et al. | |
| 2017/0206675 A1* | 7/2017 | Bynoe | G06F 3/042 |
| 2017/0272654 A1 | 9/2017 | Poindexter | |
| 2017/0300746 A1* | 10/2017 | Black | G06F 40/131 |
| 2020/0220906 A1* | 7/2020 | Port | G06T 3/0093 |

\* cited by examiner

SYSTEM AND METHOD FOR AUGMENTED REALITY VIDEO CONFERENCING

BACKGROUND

Augmented reality is an enhanced version of reality where live direct or indirect views of physical real-world environments are augmented with superimposed computer-generated images over a user's view of the real-world. Sometimes, augmented reality includes computer-generated perceptual information across multiple sensory modalities, including visual, auditory, haptic, somatosensory, and olfactory. Augmented reality can enhance one's current perception of reality.

Machine learning uses statistical techniques for teaching computers with data to perform specific tasks without being explicitly programmed to do so. The goal of machine learning is to construct algorithms that can learn from and make predictions on data. These algorithms work by creating mathematical models which can classify data. The process of creating the models can involve training and fine tuning the model parameters using input data.

SUMMARY

With advancement of the communication technologies, video conferencing has become very common in business meetings. However, there are drawbacks associated with the current video conferencing systems. For example, most of the current video conferencing systems only record a video of a meeting, and these video recordings are not text-searchable. If one desires to review the content of these recordings to understand what was discussed during the meeting, one has to review the video in its entirety, which is difficult, time-consuming and cumbersome. Moreover, the current video conference systems require platform compatibility. Specifically, it is required that all of the connecting devices be compatible with the same technology. Therefore, it is an object of this disclosure to provide a new system and method for setting up meetings.

In one example embodiment, a system includes a plurality of capturing devices and a plurality of displaying devices. The capturing devices and the displaying devices can be communicatively connected to a server. The server can receive captured data from the capturing devices and transform the data into a digitized format. For example, at least one of the capturing devices can record a video during a meeting and the capturing device can transmit the captured video to the server as a video feed. The video feed can show an area that includes handwritten text, e.g., a whiteboard. The server can receive the video feed from the capturing device and perform various processes on the video. For example, the server can perform a voice recognition, text recognition, handwriting recognition, face recognition and/or object recognition technique on the captured video.

In one example embodiment, the server can generate a digitized document, e.g., slide, which can include typed up bullet points referring to the writing included in the video feed, machine generated shapes and transcribed text referring to the spoken discussion during the meeting.

In one example embodiment, the server can include a module for analyzing each frame of the video feed and the module can conduct text recognition operations to recognize any text written on the whiteboard. The server can generate a slide which includes the recognized text. For example the slide can represent a snapshot of the whiteboard area before the whiteboard was cleared. In one example embodiment, the server can include a transcription module. The transcription module can transcribe all of the words spoken during the meeting. The server can generate a slide including all the words spoken and a time stamp for each word. In one example embodiment, the server can include a module for processing the text included in the transcript. The module can determine if any segments of the transcript are related to some of the writing on the whiteboard. In one example embodiment, the server can include a shape recognition module. The shape recognition module can recognize shapes drawn on the whiteboard and replicate the shapes in digital format on the slide.

In one example embodiment, the system can receive a second video feed from a second capturing device. The second video feed can include additional writing not included in the first video feed. The server can extract the additional writing and transmit the additional writing to augmented reality glasses. The augmented reality glasses can superimpose the additional writing over the wearer's field of view.

In one example embodiment, the server can include a face recognition module. Using the face recognition module, the server can identify the individual who writes over the whiteboard. The server can associate each bullet point in the slide with a writer. In one example embodiment, the server can include a voice recognition module. The voice recognition module can identify the person who speaks during a segment of the transcript of the meeting. The voice recognition module can associate that the segment of the transcript (which can be included in the slide) with the person's identity.

DETAILED DESCRIPTION

Figure 1:
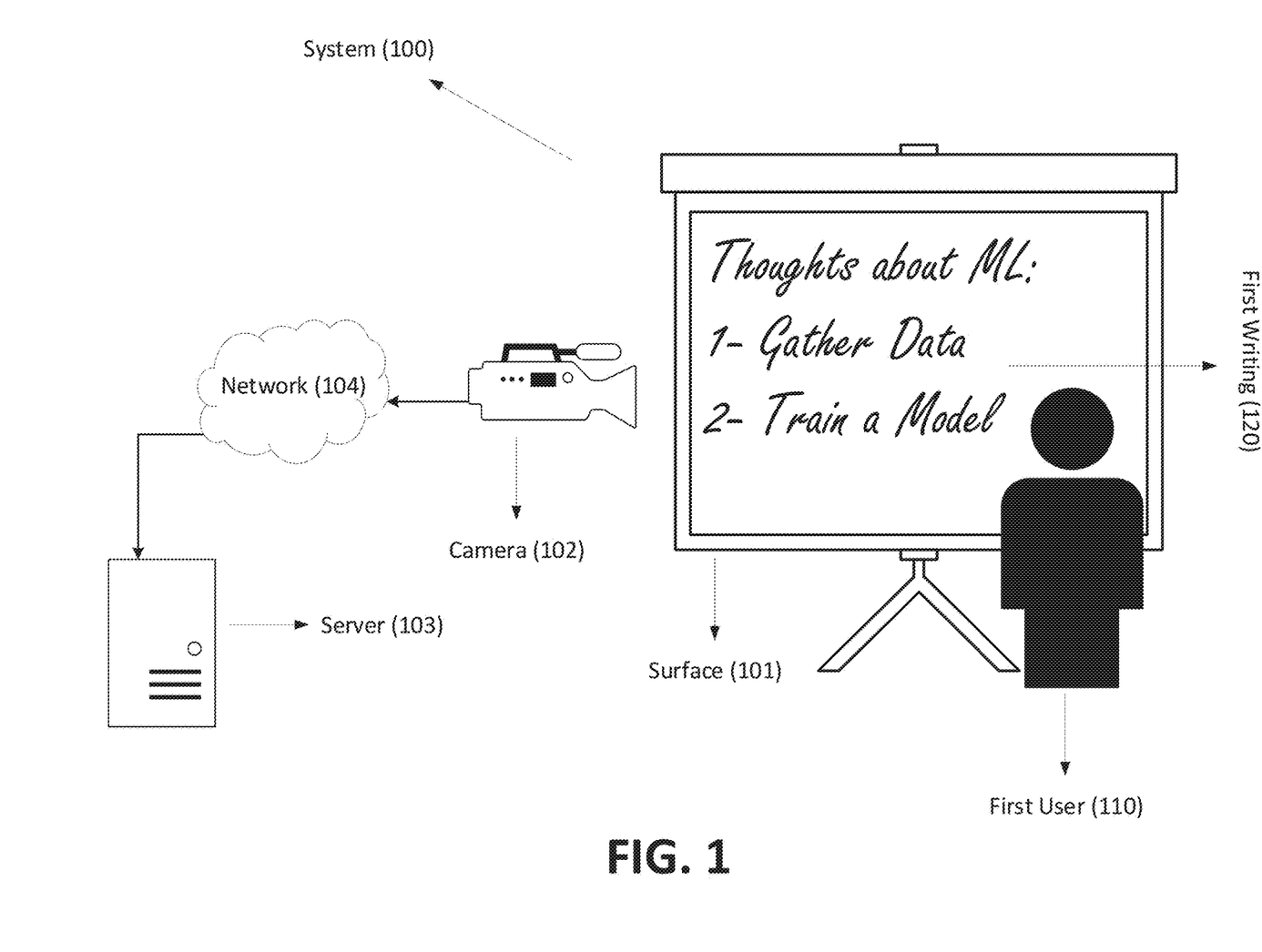
FIG. 1 shows a system according to an example embodiment.

FIG. 1 shows a system 100 according to an example embodiment. The system 100 can include a surface 101, a camera 102, and a server 103. The surface 101 can be a whiteboard, a blackboard, a paperboard, a digital display or any other surface that can capture or display a user's writing on the surface. The surface 101 can also be a projection screen, which can display the user's writing as an image over the screen. A first user 110 of the system 100 can write over the surface 101. For example, during a presentation, the first user 110 can write a topic and several bullet points over the surface 101. The camera 102 can continuously record a field of view, which can include the surface 101. The camera can transmit the recording (or video feed) to the server 103 for further analysis. The server 103 can be communicatively connected to the camera 102, e.g., through a network 104. The network 104 can be any network, including the Internet.

Figure 2:
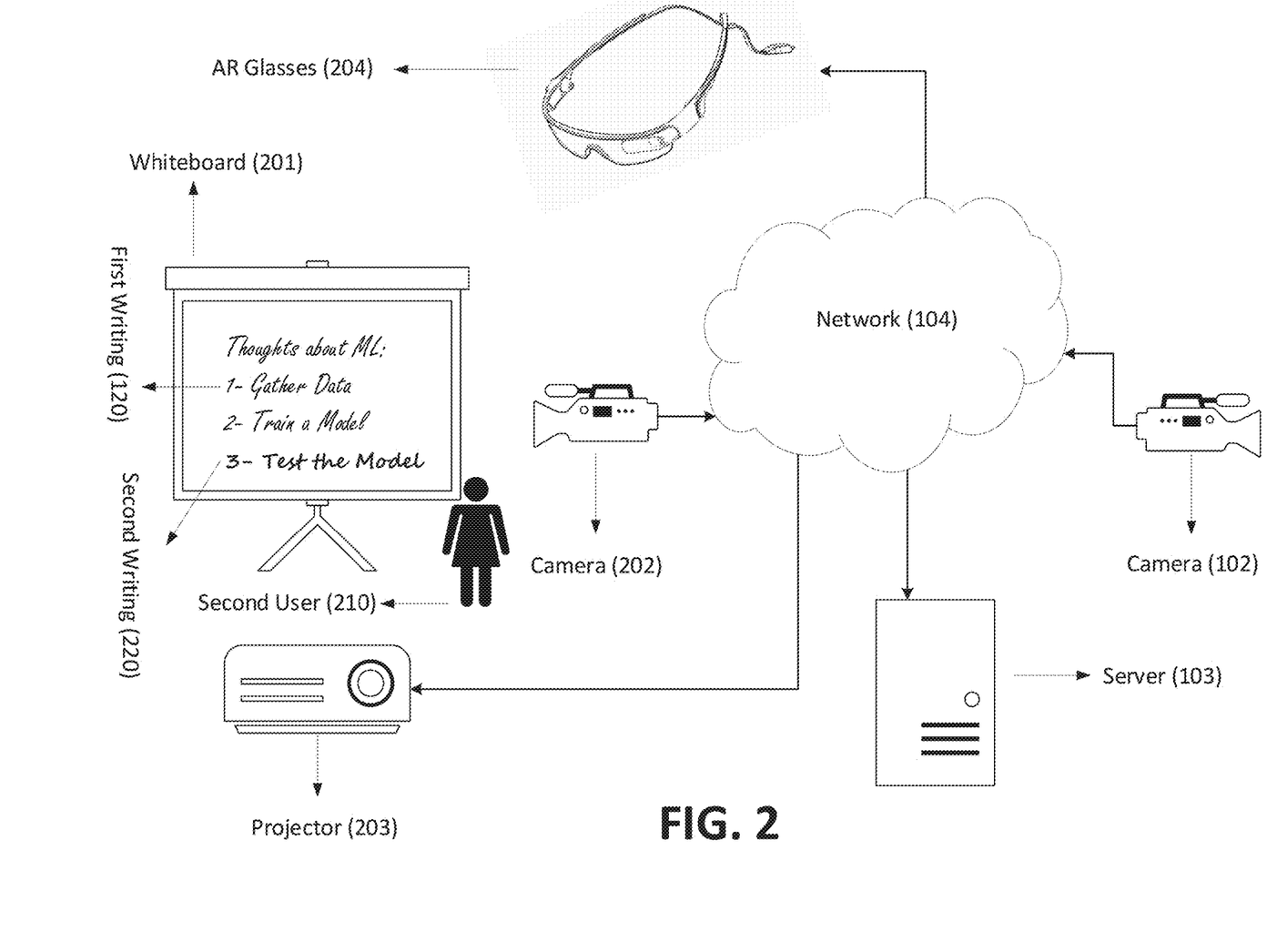
FIG. 2 shows additional components of the system according to an example embodiment.

FIG. 2 shows additional components of the system 100 according to an example embodiment. The system 100 can include a second surface (e.g., whiteboard 201) and a projector 203. The projector 203 can be communicatively connected to the server 103, e.g., through the network 104. The projector 203 can receive the video feed captured by the camera 102 from the server 103. Additionally, the projector 203 can display or project the video feed captured by the camera 102 over the whiteboard 201. The system 100 can also include a second camera, e.g., camera 202. The camera 202 can be communicatively connected to the server 103, e.g., through the network 104. The camera 202 can record a second field of view, which can include the whiteboard 201, and transmit the recording (i.e., the second video feed) to the sever 103.

In the example embodiment of FIGS. 1 and 2, the first user 110 can write a first writing 120 over the surface 101 and the camera 102 can capture the first writing 120 in the first video feed. The camera 102 can transmit the first video feed to the server 103. The projector can receive the first video feed from the server 103 and display the first video feed (or a manipulated version of the first video feed) over the whiteboard 201. A second user 210 can add a second writing 220 to the whiteboard 201. The camera 202 can capture the second writing 220 in a second video feed and transmit the second video feed to the server 103. The server 103 can manipulate and analyze the first video feed and the second video feed.

In one example embodiment, the system 100 can include augmented reality camera glasses 204 and the server 103 can transmit a signal including the second writing to a wearing present nearby the surface 101. The AR glasses 204 can be wearable computer glasses that add information alongside or to what the wearer sees. In some embodiments, the AR glasses 204 can be smartglasses or wearable computer glasses that are able to change their optical properties at runtime, e.g., smart sunglasses which are programmed to change tint by electronic means.

In one embodiment, the AR glasses 204 can superimpose images or information over a field of view. Superimposing information onto a field of view can be achieved through an optical head-mounted display, embedded wireless glasses with transparent heads-up display or augmented reality overlay that has the capability of reflecting projected digital images while allowing the user to see through the lenses. The AR glasses 204 can serve as a front end display for a remote system and function as a wearable computer with self-contained mobile apps. The AR glasses 204 can be hands-free and communicate with the Internet via natural language voice commands. The AR glasses 204 can collect information from internal or external sensors. The AR glasses 204 can control or retrieve data from other instruments or computers and support wireless technologies like Bluetooth, Wi-Fi, and GPS. The AR glasses 204 can run a mobile operating system and function as a portable media player to send audio and video files to the user via a Bluetooth or WiFi headset. The AR glasses 204 can be an activity tracker and include a full lifelogging feature.

Figure 3:
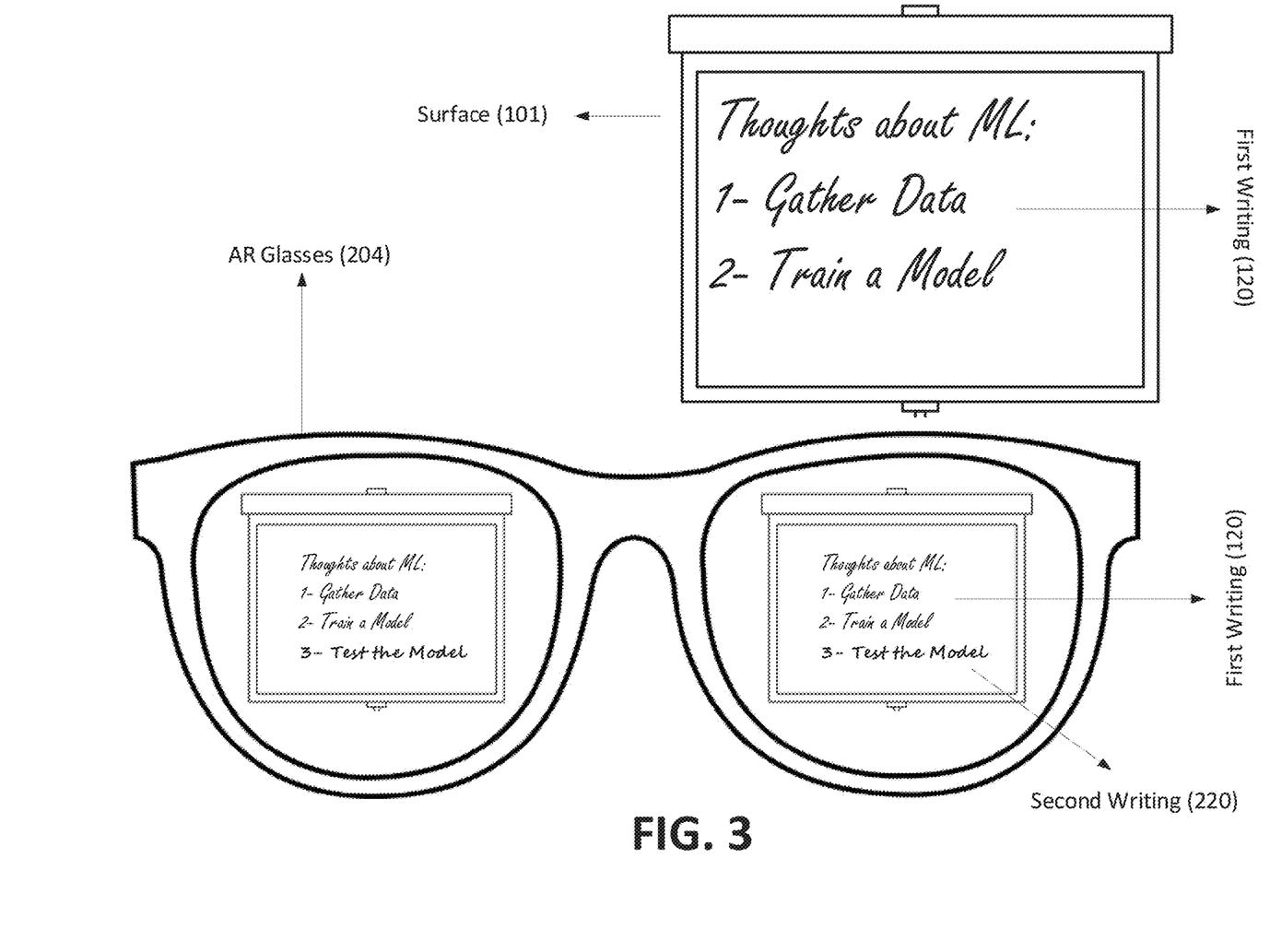
FIG. 3 shows a wearer's perspective of AR glasses according to an example embodiment.

FIG. 3 shows a wearer's perspective of the AR glasses 204 according to an example embodiment. In this example embodiment, the wearer (or the third user) is sitting nearby the surface 101, which displays the first writing 120. The second user 210 is adding the second writing 220 to the whiteboard 201. The camera 202 can record the second writing 220 and transmit it as the second video feed to the server 103. The server 103 can manipulate the second video feed to extract the second writing. The server 103 can also transmit the second writing to the AR glasses 204 to display to the user, e.g., when the user is looking at the surface 101.

Slide Generation

Figure 4:
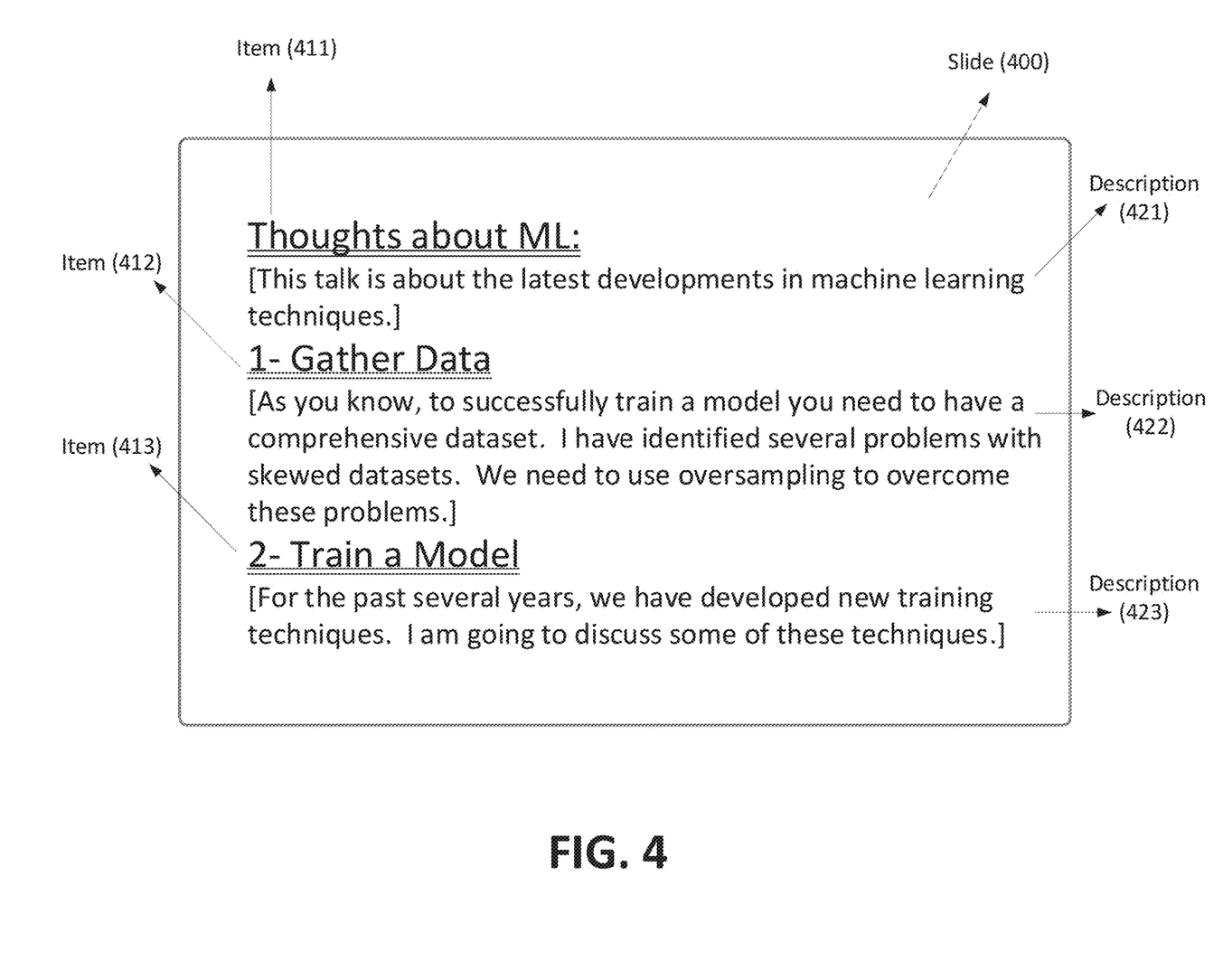
FIG. 4 shows a slide generated by a server according to an example embodiment.

FIG. 4 shows a slide 400 generated by the server 103 according to an example embodiment. In this example embodiment, the server 103 of the system 100 can generate slides which can capture the writings of the first writing 120 and the second writing 220 and the spoken content that is presented during the meeting. The system 100 can present the slide 100 to the user instead of or in addition to a video recording of the meeting. For example, the slide 400 can include a plurality of items 411-413. Each of the items 411-413 can be a bullet point, topic sentence, subject line, summary, etc. displayed in the first writing 120 or the second writing 220. These items can be lifted (or extracted) from the first writing 120 or the second writing 220. For example, the server 103 can include a text recognition module which can recognize the text written in the first writing 120 and the second writing 220 and the server 103 can organize these texts accordingly. The server 103 can include these texts in the slide 400 as items 411-413.

In one example embodiment, the server 103 can assign a time of writing to each of the items 411-413. For example, the server 103 can determine when each item was written in the first writing or the second writing. In another embodiment, the server 103 can assign a writer to each of the items 411-413. For example, prior to the presentation, one can define an identity of a first writer for the first writing and an identity of the second writer for the second writing. The server 103 can assign the first writer if an item is based on (or lifted from) the first writing and the second writer if an item is based on (or lifted from) the second writing.

The slide 400 can also include a plurality of descriptions 421-423. The server 103 can receive a voice recording from each of the cameras 102 and 202 and use a transcription module to convert the voice recording into a transcript. Each of the descriptions 421-423 can refer to a segment of the transcript of the meeting. The server 103 can also use a natural language processing module to determine the relevance of each segment of the transcript to one or more of the items 411-413. For example, the natural language processing module can assign a comparison value to each segment of the transcript. The server 103 can associate a description with an item if the comparison value is higher than a threshold.

As another example, the server 103 can use the time of writing for the items 411-413 to associate a description with an item. In this example, each segment of the transcript can be associated with a time of speaking, which can be when the segment started to be spoken in the audio recording, the segment stopped to be spoken in the audio recording, or a combination of the both. The server 103 can compare the time of writing for an item with the time of speaking for a segment, and associate the item with the segment (or description) if the time of writing is close enough to the time of speaking, e.g., less than a threshold time. As yet another example, the server 103 can use a combination of the natural language processing technique and the time of writing/speaking to determine whether to associate an item with a segment (or description).

In one example embodiment, each item and/or description can be associated with a writer or speaker. For example, at the beginning of the meeting, an administrator can define that all the writing on the surface 101 will be done by the first user 110 and that all the writing on the whiteboard 201 will be done by the second user 210. Once the text recognition module or the handwriting recognition module of the server 103 recognizes the first writing 120 on the surface 101, the server 103 associates the first writing 120 with the first user 110 (and the second writing 220 with the second user 210).

As another example, the server 103 can use a facial recognition technique to determine the identity of the writer of each item. The server 103 can analyze each video feed for items 411-413. The server 103 can detect a face on or about the time when each item is written on the surface 101 or whiteboard 201 and the server 103 can transmit a copy of the image of the face from a frame of the first video feed or second video feed to a face recognition module. The face recognition module can compare the image with other images (or facial models) of the writers stored in a database. If there is a match with a person whose identity is stored in the database, the server can assign the identity of the writer based on the information stored for the person in the database. Otherwise, the server can create a new entry in the database, and an administrator of the database can define the identity of the person later on.

As yet another example, the server 103 can use a voice recognition technique to determine the identity of the speaker of each description. The transcription module of the server 103 can transcribe each segment of each video feed (including a voice recording) to generate the descriptions 421-423. For each segment, a voice recognition module of the server 103 can determine an identity of the speaker. The voice recognition module can compare the voice samples of other speakers stored in a database. If there is a match with a person whose identity is stored in the database, the server 103 can assign the identity of the speaker based on the information stored for the person in the database. Otherwise, the server can create a new entry in the database, and an administrator of the database can define the identity of the person later on. In one embodiment, the server 103 can use a face recognition technique to identify the speaker. The process for identifying the speaker can be similar to the process for identifying a writer.

In one example embodiment, the server 103 can match a description with an item based on the identity of the writer and/or speaker. For example, if the identity of the writer for an item is the same as the identity of the speaker for a description, the server 103 can increase the comparison value for the segment of the transcript (or description). Otherwise, the server 103 can decrease the comparison value for the segment.

Figure 5:
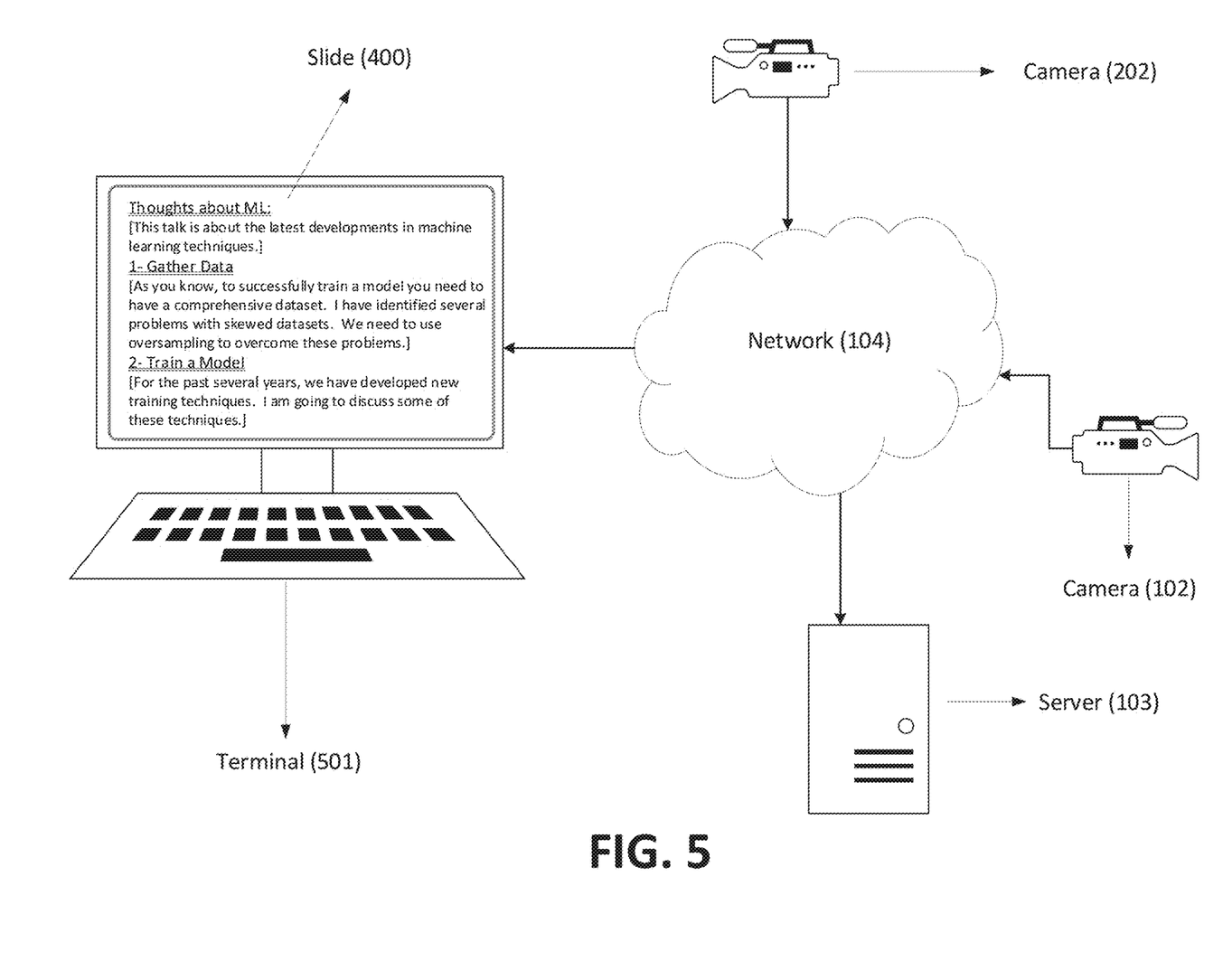
FIG. 5 shows additional components of the system according to an example embodiment.

FIG. 5 shows additional components of the system 100 according to an example embodiment. In particular, the system 100 includes a terminal 501, which can be connected to the server 103 through the network 104. The terminal 501 can display a user interface, which can show the slide 400. The slide 400 can include various links and action objects. For example, if a user of the terminal 501 clicks on any of the items, the user interface can display a part of the video feed which refers to the item. The user interface can also display the time of writing for the item as well as the identity of the writer. Similarly, if the user selects one of the descriptions in the slide 400, the user interface can play the voice recording (and/or video) pertaining the description. The user interface can also display the time of speaking for the description as well as the identity of the speaker.

In one example embodiment, the server 103 can generate a text-searchable document which includes all the slides for a meeting. Specifically, the server 103 can convert all the slides for a meeting into a word document, PDF document, or another document format. The user can keyword search the document and jump to the relevant section if needed. Additionally, the document can maintain the link or object features of the slides displayed on the user interface, e.g., if the user clicks on a description, the relevant segment of the voice recording can be played out.

In one example embodiment, the server 103 can generate the slides as the meeting is ongoing. The server 103 can transmit the slides to the terminal 501 and the terminal 501 can display the slides as the terminal 501 receives the slides. In one example embodiment, in addition to or instead of the slides, the terminal 501 can display a live video recording of the meeting.

Natural Language Processing Module

In an example embodiment, a processor of the server 103 can execute a natural language processing module. For example, the natural language processing module can use intent classification techniques. Intent classification can be a natural language understanding ("NLU") task that would be used to understand at a high level what the speaker is talking about (or what the transcript is relating to). The intent can be hard-coded with a rules-based system with regular expression (i.e., scanning the words) or train a supervised machine learning classification model on labeled examples. Many machine learning models can be used for this purpose, e.g., a neural network (or deep learning), a recurrent neural net such as LSTM, decision tree-based methods like random forest or gradient boosted machines, support vector machine, logistic regression, etc.

The server 103 can also include some preprocessing modules to convert text into character, word, or sentence embeddings that can be fed into the model. Basic preprocessing can include stemming or lemmatization, sentence or word tokenization, stopword removal, etc. This can include a term frequency based approach, including TF-IDF, or Word2Vec, Universal Sentence Encoder, etc. Part of the NLU can also include dependency parsing to try to capture negation, or sentiment analysis.

Once the natural language processing module knows the intent of each segment of the discussion, the natural language processing module can determine how relevant the segment (or the description) is to an item. In particular, the natural language processing module can compare the intent of the relevant description to each item, and associate the item with the description if the intent of the segment is close enough to the item.

As an alternative or in addition to natural language processing, a module of the server 103 can scan keywords within description and item. The module can associate a description with an item if they both include the same or similar keywords. For example, if there is a "Hello" keyword in the request, the chatbot can associate this keyword with the task of greeting. The chatbot can reply to the request based on the task associated with the keyword. For example, the chatbot can reply a greeting phrase in response to receiving a greeting task.

Display in AR Glasses

In one example embodiment, a third user can wear the AR glasses 204 and attend the meeting. The third user can be in a room including the surface 101. The AR glasses 204 can receive a signal from the server 103 which can instruct the AR glasses 204 to superimpose the second writing 220 over the field of view of the third user. There can be various techniques for generating the signal at the server 103.

In one embodiment, the server 103 can establish a background image in the first video feed. The background image can be the image that is captured by the camera 102 before the first user 110 writes the first writing over the surface 101. The server 103 can use the background image to determine what the first user 110 has written over the surface 101. For example, the server 103 can subtract the background image from an image later taken from the surface 101, and what remains is the user's writing over the surface 101, e.g., the first writing 120. In one embodiment, the server 103 can determine the first writing 110 by analyzing the colors of the first video feed. For example, the first writing 110 can be in black and the server 103 can determine the first writing 110 by separating the black pixels. In another embodiment, the server 103 can separate the first writing by using a handwriting recognition technique. For example, the server can determine that an object drawn over the surface 101 is the first writing 110 if the handwriting recognition technique determines that the object is a handwriting.

In one example embodiment, after establishing the background image for the first video feed, the server 103 can subtract the background image from the first video feed and transmit what remains to the projector 203. For example, after subtracting the background image from the first video feed, the server 203 can transmit the first writing to the projector 203.

In one example embodiment, the server 103 can determine a background image for the second video feed. For example, the camera 202 can capture an image from the whiteboard 201 before the projector 203 displays any images over the whiteboard 201 and the second user 210 writes anything over the whiteboard 201. Using the background image for the second video feed, the server 103 can determine the second writing on the whiteboard 201. For example, the server 103 can subtract the background image for the second video feed and the first writing transmitted from the server 103, to determine what remains on the whiteboard 201, which can be the second writing 220.

In another example embodiment, the server 103 can determine the second writing without subtracting the first writing from the second video feed. For example, the server 103 can determine a background image for the second video feed, which can be the image of the whiteboard 201 before the projector 203 displays anything over the whiteboard 201 and the second user 210 writes anything over the whiteboard 201. The server 103 can transmit a signal to each of the camera 202 and the projector 203 to cause them to work out of sync. Working out of sync can mean that when the projector 203 does not display an image (or a frame), the camera 202 captures an image (or a frame) of the whiteboard 201. In this example, the server 103 can determine the second writing 220 by subtracting the background image from the second video feed.

In one example embodiment, the server 103 can transmit the second writing to the AR glasses 204 to superimpose the second writing over the user's field of view. For example, the third user can calibrate the AR glasses with the surface 101 such that every time the user faces the surface 101, the AR glasses 204 can display the second writing superimposed over the third user's field of view. FIG. 3 shows the AR glasses 204 while the glasses are facing the surface 101. In this example embodiment, the second writing 220 appears in the field of view of the user when the user looks at the surface 101.

The third user can use various techniques to calibrate the AR glasses 204 such that the AR glasses 204 determine that they are facing the surface 101. In one example embodiment, the third user can face the surface 101 and press a button on the AR glasses 204. A camera of the AR glasses 204 can take a photo of the surface 101 and every time the user faces the surface 101, an object recognition module of the AR glasses 204 can determine that the user is facing the surface 101. Accordingly, the AR glasses 204 can display the second writing 220 received from the server 103 when the user faces the surface 101.

As another example, the AR glasses 204 can include a compass and an accelerometer sensor. During calibration, the user can press a button on the AR glasses 204 when the AR glasses are facing the surface 101, and the AR glasses 204 can store the relative position of the AR glasses 204. When the user turns around and looks up or down, the compass and the accelerometer sensor can detect the relative position of the AR glasses 204 and if the AR glasses 204 are positioned such that they are facing the surface 101 (as it was stored during calibration), the AR glasses can display the second writing 220. As yet another example embodiment, the surface 101 can include a beacon and the AR glasses 204 can include a receiver. The receiver can be set up on the AR glasses 204 such that the receiver can receive a signal from the beacon only if the AR glasses 204 are directly facing the beacon. The AR glasses 204 can determine that they are facing the surface 101 if the AR glasses can receive a signal from the beacon on the surface 101.

Figures 6A, 6B:
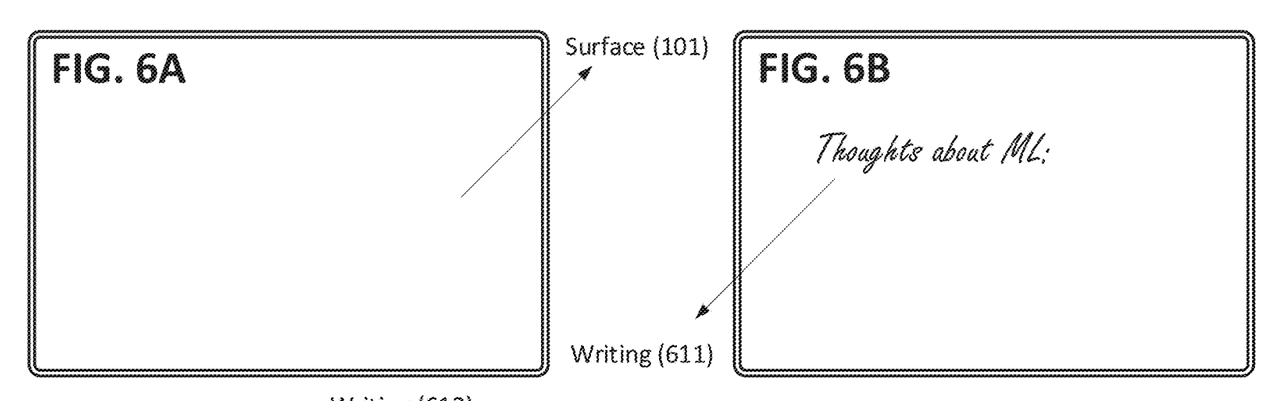
FIG. 6 shows a slide generation process according to an example embodiment.

FIG. 6 shows a slide generation process according to an example embodiment. In this example embodiment FIG. 6A shows a first frame of the first video feed. The first frame does not show any writing on the surface 101, and as such, the server 103 can determine that the first frame shows the background image for the first video feed. FIG. 6B shows a second frame of the first video feed. The second frame includes a writing 611. The server 103 can use this frame and the background image to detect the writing 611, e.g., by subtracting the background image from the second frame. Using a text recognition module or a handwriting recognition module, the server 103 can recognize the writing 611 and add it to the slide 400.

Figures 6C, 6D:
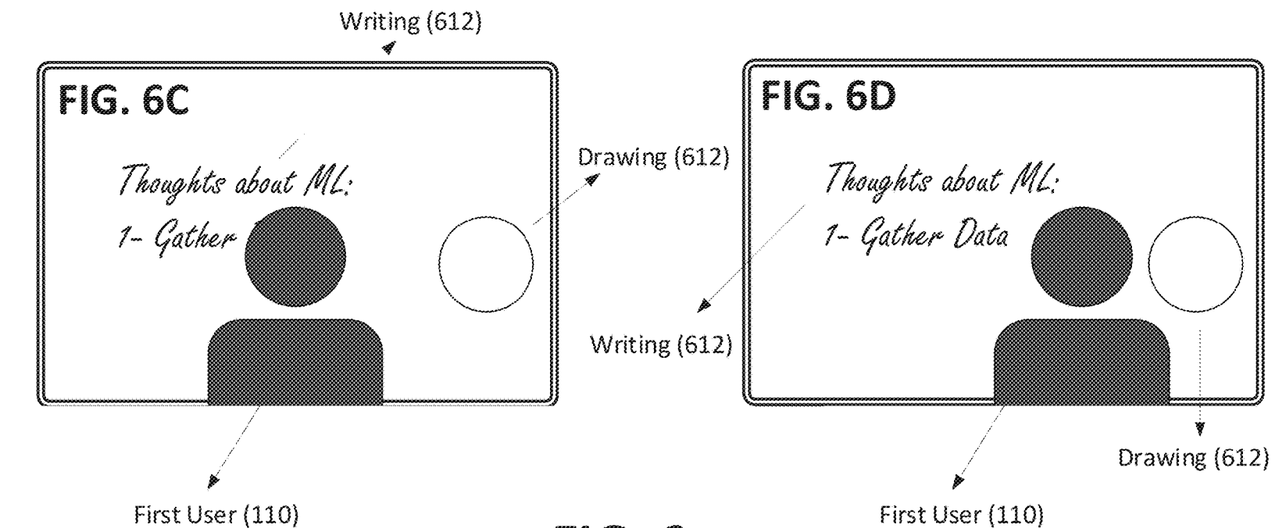

FIG. 6C shows a third frame and FIG. 6D shows a fourth frame of the first video feed. Each of the third frame and the forth frame displays a writing 612, a drawing 613 and the first user 110 against the surface 101 (or the background image). In this example, the sever 103 can determine that the user 110 is not a writing or a drawing on the surface 101. The server 103 can make the determination by comparing several frames of the first video feed. For example, the server 103 can include an object movement module which can determine is an object moves between successive frames of a video feed. If the object moves, the object movement module can determine that the object is not a writing or drawing. Otherwise, the object movement module can determine that the object is a writing or drawing. If the object movement module determines that an object is a person, the object movement module can notify the server 103 to ignore the person for the purposes of creating the slide 300.

The server 103 can include a shape recognition module. The shape recognition module can recognize a drawing and replicate a digital form of the drawing in the slide 300. For example, the shape recognition module can recognize the drawing 612 as a circle and generate a circle to be included in the slide 300.

In one example embodiment, the server 103 can include a language recognition module, which can recognize a language used in the writings on the surface 101 or the transcript of the meeting. An administrator of the server 103 can define a default language for the server 103. If during a meeting, the language recognition module determines that the language of a writing or part of the transcript is not the default language, the language recognition module can translate the language and send the translation to the server 103. The server 103 can include the translation in the slide 300. The server 103 can also include a link in the slide 300, and when a user clicks on the link, the slide 300 can show the original untranslated item or description.

In one example embodiment, the server 103 can include a word processing module, which can detect typos in the writings on the surface 101. If the word processing module detects a typo in a writing on the surface 101, the word processing module can fix the typo and transmit a notification including the fixed typo to the server 103. The server 103 can include the corrected typo in the slide 300. The server 300 can also include a link in the slide 300, which when the user click on the link, the original typo can be displayed to the user.

Technical Implementation of the Server

Figure 7:
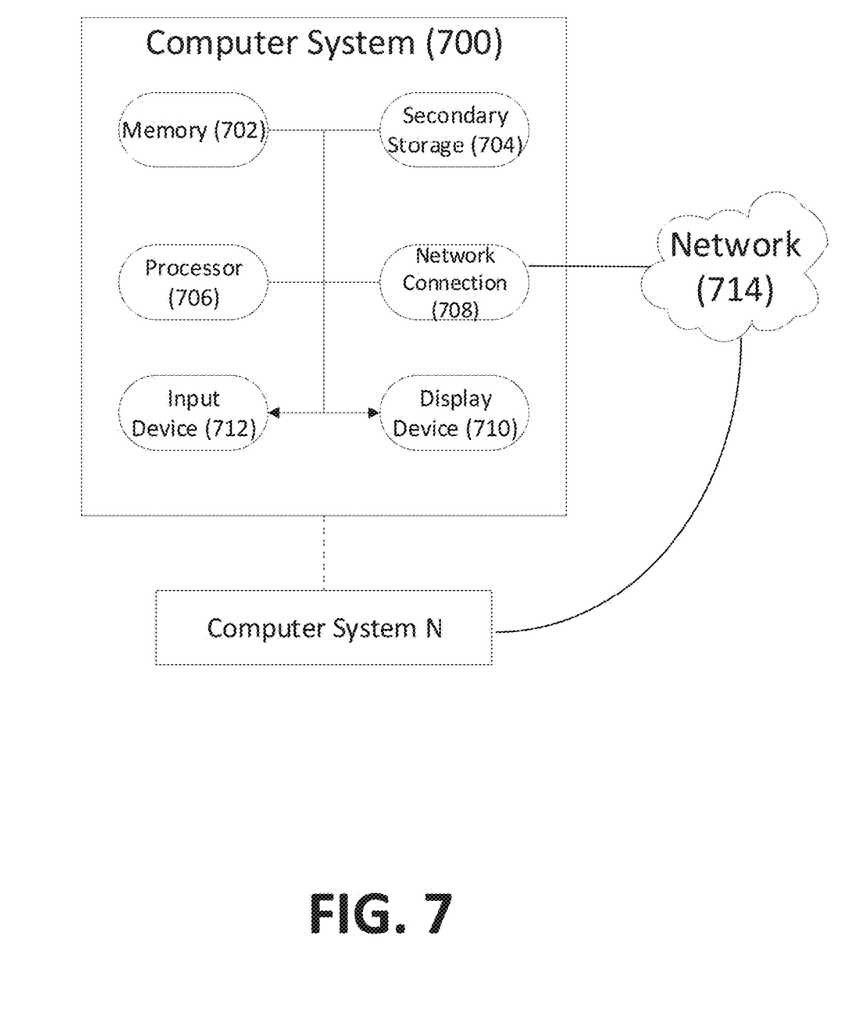
FIG. 7 illustrates exemplary hardware components for a server.

FIG. 7 illustrates exemplary hardware components of a server. A computer system 700, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 700, may run an application (or software) and perform the steps and functionalities described above. Computer system 700 may connect to a network 714, e.g., Internet, or other network, to receive inquiries, obtain data, and transmit information and incentives as described above.

The computer system 700 typically includes a memory 702, a secondary storage device 704, and a processor 706. The computer system 700 may also include a plurality of processors 706 and be configured as a plurality of, e.g., bladed servers, or other known server configurations. The computer system 700 may also include a network connection device 708, a display device 710, and an input device 712.

The memory 702 may include RAM or similar types of memory, and it may store one or more applications for execution by processor 706. Secondary storage device 704 may include a hard disk drive, floppy disk drive, CD-ROM drive, or other types of non-volatile data storage. Processor 706 executes the application(s), such as those described herein, which are stored in memory 702 or secondary storage 704, or received from the Internet or other network 714. The processing by processor 706 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 700 may store one or more database structures in the secondary storage 704, for example, for storing and maintaining the information necessary to perform the above-described functions. Alternatively, such information may be in storage devices separate from these components.

Also, as noted, processor 706 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 700.

The input device 712 may include any device for entering information into the computer system 700, such as a touch-screen, keyboard, mouse, cursor-control device, microphone, digital camera, video recorder or camcorder. The input and output device 712 may be used to enter information into GUIs during performance of the methods described above. The display device 710 may include any type of device for presenting visual information such as, for example, a computer monitor or flat-screen display (or mobile device screen). The display device 710 may display the GUIs and/or output from sub-system components (or software).

Examples of the computer system 700 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 700 is shown in detail, system 700 may use multiple computer systems or servers as necessary or desired to support the users and may also use back-up or redundant servers to prevent network downtime in the event of a failure of a particular server. In addition, although computer system 700 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 700, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A method comprising:
receiving, at a transceiver of a server, a first video feed from a first camera, wherein:
the first camera is pointed at a first surface; and
the first surface includes a first writing;
identifying, at the server, a first user in the first video feed;
receiving, at the transceiver of the server, a second video feed from a second camera, wherein:
the second camera is pointed at a second surface; and
the second surface includes a second writing;

identifying, at the server, a second user in the second video feed;

generating, using a processor of the server, a slide based on the first video feed and the second video feed, wherein the slide includes:

a first item based on the first writing and a second item based on the second writing;

a first description in association with the first item based on a first transcript of the first video feed and a second description in association with the second item based on a second transcript of the second video feed;

a first indicator configured to display a first identify of the first user in association with the first item and a second indicator configured to display a second identity of the second user in association with the second item; and the first item includes a first selectable link to the first video feed and the first transcript and the second item includes a second selectable link to the second video feed and the second transcript; and transmitting, using the transceiver of the server, the slide to a terminal wherein the terminal is configured to display the slide.

2. The method of claim 1, wherein the server includes a handwriting recognition module which is configured to scan a frame of the first video feed and recognize a text included in the first writing.

3. The method of claim 2, wherein the first item included in the slide is the text included in the first writing.

4. The method of claim 1, wherein the first identity of the first user is determined by a facial recognition module configured to:

scan a frame of the first video feed;

detect a face in the frame of the first video feed; and identify the face based on a comparison of the face with a plurality of photos of faces stored in a database.

5. The method of claim 1, wherein the server includes a transcription module which is configured to transcribe a segment of the first video feed to generate the first transcript.

6. The method of claim 5, wherein the first description included in the slide is the first transcript.

7. The method of claim 1, wherein the first identity of the first user is determined by a voice recognition module configured to:

scan a segment of the first video feed;

detecting a voice of the first user of the first video feed; and identifying the first user based on a comparison of the voice with a plurality of voice models stored in a database.

8. The method of claim 1, wherein the first selectable link is configured to display a piece of information when the first selectable link is clicked on through a user interface of the terminal.

9. The method of claim 8, wherein the piece of information is a time of writing the first writing in the first video feed.

10. The method of claim 1, further comprising:

generating an augmented reality signal including the second writing, wherein the augmented reality signal is configured to cause augmented reality glasses to superimpose the second writing on a field of view of a wearer; and transmitting the augmented reality signal to the augmented reality glasses.

11. The method of claim 10, wherein the server includes a handwriting recognition module which is configured to scan a frame of the second video feed and recognize a text included in the second writing.

12. The method of claim 11, wherein the server is configured to determine a background image in the second video feed and the server is configured to determine the second writing based on the background image.

13. The method of claim 1, further comprising:

generating an augmented reality signal including a text of the second writing, wherein the augmented reality signal is configured to cause augmented reality glasses to superimpose the text of the second writing on a field of view of a wearer; and transmitting the augmented reality signal to the augmented reality glasses.

14. A method comprising:

receiving at a terminal a slide from a server; and displaying the slide in a display of the terminal;

wherein the server is configured to:

receive, at a transceiver of the server, a first video feed from a first camera, wherein:

the first camera is pointed at a first surface; and the first surface includes a first writing;

identify, at the server, a first user in the first video feed;

receive, at the transceiver of the server, a second video feed from a second camera, wherein:

the second camera is pointed at a second surface; and the second surface includes a second writing;

identify, at the server, a second user in the second video feed;

generate, using a processor of the server, a slide based on the first video feed and the second video feed, wherein the slide includes:

a first item based on the first writing and a second item based on the second writing;

a first description in association with the first item based on a first transcript of the first video feed and a second description in association with the second item based on a second transcript of the second video feed;

a first indicator configured to display a first identify of the first user in association with the first item and a second indicator configured to display a second identity of the second user in association with the second item; and the first item includes a first selectable link to the first video feed and the first transcript and the second item includes a second selectable link to the second video feed and the second transcript.

15. The method of claim 14, wherein the server includes a handwriting recognition module which is configured to scan a frame of the first video feed and recognize a text included in the first writing.

16. The method of claim 15, wherein the first item included in the slide is the text included in the first writing.

* * * * *